Jan. 10, 1939.    L. IMBLUM    2,143,010
CHUCK
Filed April 9, 1937    2 Sheets-Sheet 1
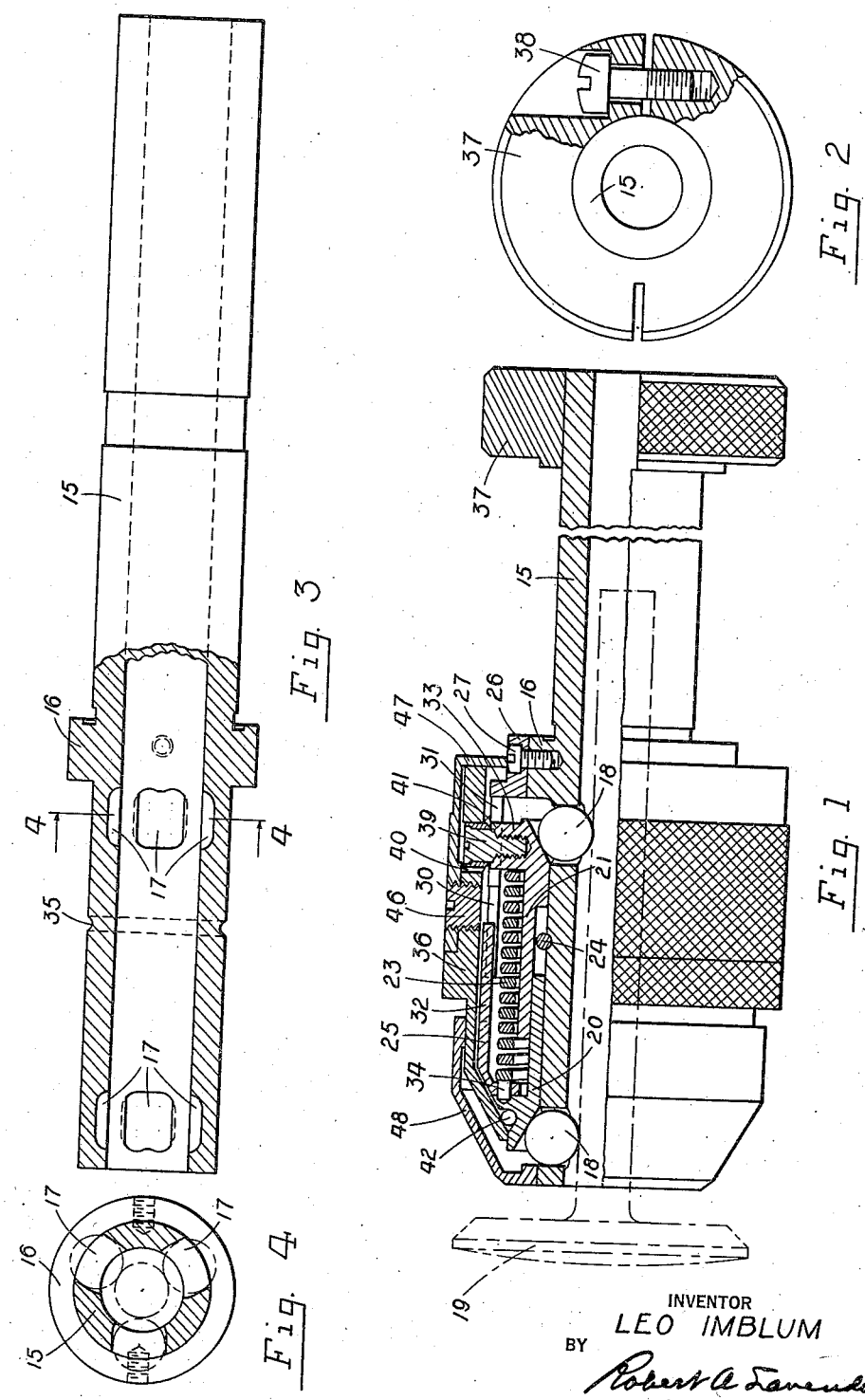
INVENTOR
LEO IMBLUM
BY
Robert A. Lavender
ATTORNEY Jan. 10, 1939.　　　　　　　L. IMBLUM　　　　　　　2,143,010
CHUCK
Filed April 9, 1937　　　　2 Sheets-Sheet 2
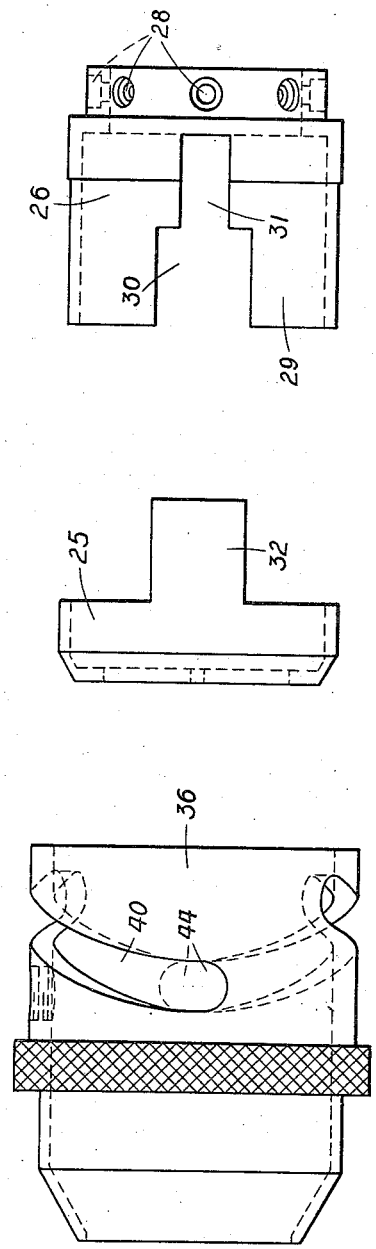
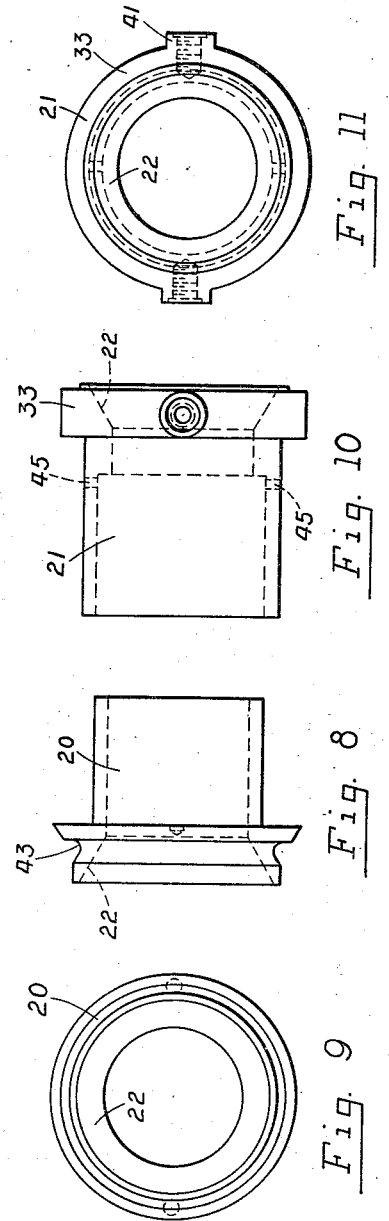
INVENTOR
LEO IMBLUM
BY
ATTORNEY Patented Jan. 10, 1939

2,143,010

UNITED STATES PATENT OFFICE 2,143,010

CHUCK

Leo Imblum, San Diego, Calif.

Application April 9, 1937, Serial No. 135,934

8 Claims. (Cl. 279—75)

(Granted under the act of March 3, 1883, as amended April 30, 1928; 370 O. G. 757)

This invention relates to chucks and more particularly to chucks of the quick opening type. In the resurfacing of internal combustion engine and other similar valves by means of resurfacing machines of the type in which the valve stem is placed in a chuck and rotated in contact with a rotary grinding wheel across the surface of which it is fed as the grinding operation progresses, a slight variation in the alignment of the valve and stem produces a corresponding variation of the angle of the valve seating surface causing it to correspondingly diverge from the angle of the seating surface. It is apparent that it is impossible to produce uniform valve seat contacts when the valve stems are out of line or off center. The principal difficulty that has been encountered in the effort to produce a valve chuck for a grinding machine by which perfect results may be obtained in every instance by the average workman, is that incident to the production of a chuck whereby a valve stem is held, the stem of the valve is not maintained in exact alignment with the axis of the chuck.

The object of the present invention is to produce a chuck by which the valve stem may be clamped to the grinding spindle, the valve stem being positioned in every instance with its axis in exact alignment with the axis of the spindle, the alignment being automatic, and hence incident to the closing of the chuck.

Another object of the invention is to produce a chuck in which the wear by the gripping jaws is uniform, and in which the wear may be compensated for if it should become necessary.

A further object of the invention is to produce a chuck in which the work may be automatically centered and secured or removed in a minimum of time by the mere partial rotation of a single element without stopping the chuck or grinding machine.

A further object of the invention is to provide a chuck that, employing the well known principle of gripping by means of ball jaws, having ball slots so shaped that each has a flat narrow surface in an accurate plane with each other for contacting the ball jaws in order to accurately seat them. The shape of the slots also provides a clearance space for foreign matter that otherwise might be forced between the balls and their seats.

A further object of the invention is to provide a chuck that has a capacity of wide range, jaws that are longitudinally stable, and a long bearing area to guide each conically bored control member.

A further object of the invention is to provide a chuck wherein covers are provided that form an oil reservoir so that the parts operate in oil, and that prevent dirt from entering its working parts.

A still further object of the invention is to provide a chuck that will chuck different size valve stems and tapered arbors, yet will centrally position all sets of jaws upon their full release.

In the preferred embodiment of the invention illustrated, the gripping action of the chuck is obtained by means of a series or at least two sets of spherical members spaced apart in the direction of the axis of the spindle. These are arranged about the circumference of a hollow spindle or chuck body and held in position by suitable accurately guided members, the said members being forced in opposed directions simultaneously with uniform pressure as the chuck throw-out collar is actuated. This action with the spacing of the spherical members circumferentially and in the direction of the axis serves to center and position the valve stem with extreme accuracy, the pressure exerted upon said members being in a practical sense, absolutely uniform.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which:

Fig. 1 is an elevation, partly in section, of a chuck produced in accordance with the present invention;

Fig. 2 is a view of the rear of the chuck;

Fig. 3 is an elevation, partly in section, of the chuck spindle;

Fig. 4 is a section on the line 4—4 of Fig. 3;

Fig. 5 is a view of the throw-out collar for compressing a spring to loosen the gripping jaws;

Fig. 6 is the driver for the front sleeve member;

Fig. 7 is the driver for the rear sleeve member;

Fig. 8 is the front sleeve member;

Fig. 9 is an end view of Fig. 8;

Fig. 10 is the rear sleeve member; and

Fig. 11 is an end view of Fig. 10.

Referring more in detail to the drawings, a hollow spindle 15 is provided with a collar 16 and a plurality of short substantially square openings 17, more clearly shown in Fig. 3, adapted to receive and retain spherical members 18 that provide gripping means to center and securely hold the valve stem of a valve 19 to be resurfaced.

Mounted exteriorly of and movable along the spindle are a pair of telescoping sleeve members 20 and 21, having their outer ends conically bored, as at 22, to receive spherical members 18. The front sleeve 20 has an unusually long bore that fits closely over the spindle. The rear sleeve 21, likewise, has a long bore, but it fits partly over the spindle and partly over the front sleeve. The telescoping fit provides an exceptionally long bearing area in each sleeve bore, minimizing tilting and its consequent error in the resurfacing result. The sleeves are actuated by an expansion spring 23 of twin construction having its ends keyed diametrically opposite to the respective sleeves. This permits even pressure on opposite sides of each sleeve causing the conical bores of the sleeves to force the spherical members inwardly through the openings 17 until the valve stem is securely gripped with equal force by each of said members. The sleeves are limited in their inward movement by a ring 24 suitably mounted in a recess 35 (Fig. 3) in the spindle so as to turn with, but not axially of the spindle.

The sleeves rotate with the spindle, being driven by drivers 25 and 26, shown in detail in Figs. 6 and 7 respectively. The rear driver 26 is made fast to the collar 16 of the spindle by a suitable fastening element 27 passing through one of a series of openings 28 in a flange of the driver. A portion of the skirt 29 of the driver is cut away to form a slot 30 having a reduced portion 31. The larger section of this slot, 30, is adapted to receive a tongue 32 extending from the front driver 25 so as to interlock the drivers whereby the front driver will be impelled by the rear driver. The rear sleeve has a collar 33 having an ear 41 that engages in the reduced portion 31 of the slot through which motion is imparted to said sleeve by the driver 26. The front driver 25 is firmly attached to the front sleeve in any suitable manner that will provide a positive drive for the sleeve. In the drawings this means is illustrated as a pin 34 that secures the spring to the sleeve, but it is to be understood that other desirable means may be employed. By this arrangement it is evident that each of the sleeves will be rotated by and at the same speed as the spindle.

The chuck is opened from its closed position by turning a throw-out collar 36, or by holding the throw-out collar steady while turning the spindle either by its motivating power or by the knurled handwheel 37 that is clamped to the spindle by a means 38. This action causes trunnion rollers 39 mounted in the ears 41 formed on the collar 33 of the rear sleeve to travel in curved slots 40 (Fig. 5) in the throw-out collar, and as they move along the slots a thrust is produced on the rear sleeve, while ball bearings 42, operable in a ball race 43 in the front sleeve, take up the counter thrust. Hence, both sleeves are actuated to remove the pressure on the spherical members, permitting easy insertion into or extraction from the chuck of an object held thereby. When the throw-out collar is turned to its full opened position, the rollers ride out of the slots into short straightaway sections 44 connected to the ends of the slots, thus holding the chuck in opened position. When it is desired to close the chuck, a slight rotation is imparted to the throw-out collar causing the rollers to be removed from the straightaway sections, when spring 23 exerts its pressure against the sleeves forcing them outward and the spherical members inward into gripping position. Too rapid closing or a snapping shut of the chuck is prevented by the pressure of the air entrapped in the telescoped sleeves, which bleeds out through small apertures 45 in the wall of the rear sleeve 21, more clearly shown in Fig. 10.

The continued moving of the sleeves over the spherical members in opening and closing the chuck may in time cause grooves to be worn in the surfaces of the conical bores of the sleeves. Such wear may be compensated for by providing a new position of contact of the said members with the surfaces of the conical bores which may be accomplished by turning the spindle relatively to the sleeves, after first removing the fastening element 27. This relative movement causes another one of the series of openings 28 to register with the opening in the spindle for reception of the fastening element (Fig. 1) whereupon the element is again placed in position securely holding the sleeves and spindle in their new relative positions.

Oil is admitted to the interior of the throw-out collar through an opening closed by plug 46, being retained therein by a cover 47 having a push fit on the throw-out collar. Dirt, dust and other foreign matters are prevented from entering the nose end of the chuck by a cover 48 that has a push fit on the spindle and a sliding fit on the forepart of the throw-out collar. These two covers render the chuck dustproof.

It will be understood that the above description and accompanying drawings comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

What I claim as new is:

1. A chuck including a spindle, spherical gripping members, a plurality of conically bored control sleeves for said members, a resilient means interposed between the sleeves for forcibly contacting them with said members, and a single means to compress said resilient means for simultaneously relieving the pressure of all the sleeves on said members.

2. A chuck including a spindle, spherical gripping members, a plurality of control sleeves having flared ends for the reception of said members slidable on the spindle, interposed between the sleeves means for normally holding them away from each other and in contact with said members, and a rotatable means for compressing said sleeve holding means whereby the sleeves may move toward each other.

3. A chuck including a spindle, spherical gripping members, a plurality of telescopic control sleeves each having a cup-shaped end for reception of said members, means interposed between the sleeves for forcible engagement thereof with the said members, and means for relieving the pressure of the sleeves on said members.

4. A chuck including a spindle, spherical gripping members, telescopic control sleeves for said members, one of said sleeves having a bearing throughout its length on the spindle, the other having a bearing surface on both the spindle and the first named sleeve, means for forcibly engaging the sleeves with said members, and means for moving the sleeves in opposed directions for relieving the pressure of the sleeves on said members.

5. A chuck including a spindle, spherical gripping members, telescopic control sleeves for said members, intermeshing drivers for the sleeves, one of said drivers being driven by the spindle, means for contacting the sleeves with said members, and means for relieving the pressure of the sleeves on the members.

6. A chuck including a spindle, spherical gripping members, telescopic control sleeves for said members, interlocking drivers for the sleeves, one of said drivers being secured to the spindle, and having a slot therein, the other of said drivers being provided with a tongue for engagement in the slot, means for contacting the sleeves with the said members, and means for relieving the pressure of the sleeves on said members.

7. A chuck including a spindle, spherical gripping members, control sleeves, motivating means for contacting said sleeves with the members, a throw-out collar provided with curved slots, and trunnion rollers mounted on the sleeves and operable in the slots for retracting the sleeves when the collar is actuated.

8. A chuck including a spindle, spherical gripping members, control sleeves, motivating means for contacting said sleeves with the members, a throw-out collar provided with curved slots, and trunnion rollers mounted on the sleeves and operable in the slots for retracting the sleeves when the collar is actuated, each of said slots having a substantially straight terminus into which the trunnion rollers engage to hold the chuck in an opened position.

LEO IMBLUM.